United States Patent Office 2,794,974
Patented June 4, 1957

2,794,974

COMPENSATION FOR TURBULENCE AND OTHER EFECTS IN INTRUDER DETECTION SYSTEMS

Samuel M. Bagno, Astoria, and Jack B. Cooper, New York, N. Y., assignors to Walter Kidde & Company, Inc., Belleville, N. J., a corporation of New York Application January 24, 1955, Serial No. 483,577

12 Claims. (Cl. 340—258)

The present invention relates to an intruder detection system which functions by receiving radiations emanating or reflected from a moving object, and in particular to such a system in which means are provided for eliminating the undesirable effects arising from turbulence and certain other occurrences.

One type of detection system in connection with which the present invention is particularly useable, and in connection with which it is here specifically described, is that disclosed and claimed in Bagno Patent 2,655,645 of October 13, 1953 entitled "Method and Apparatus for Detecting Motion in a Confined Space," owned by the assignee of the instant invention. In that system a space to be protected is filled with radiations of a given comparatively high frequency or frequencies by transmitting such radiations into the space, those radiations are reflected from walls or objects in the space, and they are then received and analyzed. If no motion occurs in the protected space, the frequency of the received radiations will be the same as the frequency of the transmitted radiations. If there should be motion in the room, however, the waves reflected from or otherwise affected by the moving object will be sensed by the receiving instrumentality as having a frequency different from the transmitted frequency, the frequency difference usually being due to a Doppler effect, and hence being termed the Doppler frequency. Circuitry is provided which will detect the presence or absence of such Doppler frequencies and which will actuate an alarm whenever appropriate Doppler frequencies are detected.

The sensitivity of the system described above is extremely great, so much so that one of the primary problems involved in devising a commercially useful intruder detection system is the artifical reduction of the sensitivity of the system so that false alarms will not result.

There are numerous factors which might give rise to such false alarms. Some of them are relatively easy to overcome. For example, the magnitude of the Doppler signal received will in part be dependent upon the magnitude or size of the moving reflecting object. If the system is to detect a human intruder but not a mouse, the gain of the system is adjusted so that the amplitude of the signal derived from the movement of a small object such as a mouse would not be sufficient to actuate the alarm relay.

In practice, however, the situation is much more complex. Many events occur which produce Doppler frequency signals of a magnitude sufficient to set off the alarm, but which nevertheless should not set off the alarm in a commercial system. Shock sounds, such as those caused by water hammer in radiator pipes, are of such a nature. Various electrical effects, such as arcing of adjacent electrical equipment, line voltage changes, or even complete failure of line voltage for short periods of time on the order of several seconds, may be similarly characterized.

The significance of certain other complicating factors can be appreciated only when it is realized that Doppler effect frequencies are produced even when discrete objects do not move. The radiations which fill the space must pass through the air in the space, and if the air is accelerating the radiations are affected just as if they had been reflected from a moving discrete object. A change in temperature of the room will cause the velocity of the radiations as they pass through the air to vary, and the actual changing of velocity will to the receiving instrumentality, appear as a Doppler frequency. Normal temperature changes, fortunately, occur sufficiently slowly that the Doppler frequencies produced thereby are extremely low, much lower than those produced by occurrences detection of which is desired. The circuit may readily be devised to reject such extremely low Doppler frequencies, and consequently temperature change in and of itself, except under such abnormal conditions that the actuation of an alarm would be warranted, is readily eliminated as a factor.

Normal air turbulences are, however, a much more significant factor. Such normal turbulences may occur, for example, because of the presence in the room of a heated radiator, a fan or air conditioning system in operation, or the like.

Prior to the present invention, these turbulence effects were prevented from actuating the alarm by relying on the fact that the amplitude of the signals deriving from normal turbulence was less than the amplitude of signals deriving from an actual intruder. Hence the sensitivity of the system was decreased to a degree sufficient to prevent the alarm from being set off by normal turbulence. This of course reduced the sensitivity of the system to those signals which should actuate it, thus giving rise to an obvious loss in overall effectiveness. In addition, the incidence of false alarms due to turbulence, although greatly reduced, was not completely eliminated.

The effect of turbulence in the system must be distinguished from the effect of flame or fire. It is desired that the system detect the latter but not the former. The existence of a fire will give rise to turbulence to an extremely high degree, but the presence of an actual flame is an additional and distinguishing characteristic. Because of the low density of the hot air that composes a flame it reflects radiations in the same manner as a solid object, at least when those radiations are in the ultrasonic range. The flickering of the flame and the cone of hot air above it simulates a moving intruder and therefore will set off the alarm entirely independently of the turbulence effects produced by the flame. In general, the size of flame which will cause the alarm to be set off will depend upon the sensitivity setting of the system. As a rule of thumb, it may be stated that the system will detect a flame of about one quarter the size of the minimum detectable physical intruder. Consequently it will be seen that by eliminating the effect of turbulence on the detection system, which is the primary objective of the instant invention, the capability of the system to detect flame and set off the alarm in accordance therewith is not impaired. Indeed, by eliminating the effect of turbulence on the system, it may be made sufficiently sensitive as to be capable of detecting flames even smaller in size than has heretofore been thought practical.

We have discovered that the Doppler frequencies resulting from turbulence may be distinguished from the Doppler frequencies resulting from flame or from the movement of a discrete object. We have further discovered that the same system which eliminates the effect of turbulence will also, to a large extent, eliminate the effect of various unit or transient impulses, such as arcing, line voltage changes and the like, the Doppler frequencies produced by those impulses having characteristics comparable to the Doppler frequencies produced by turbulence.

When a person walks in the space being protected, various parts of his body will be moving at different speeds. Since all parts of his body will be reflecting radiations within the protected space, an intruder will therefore not produce a single Doppler frequency, but will instead produce a spectrum of Doppler frequencies. Investigation has revealed that the amplitudes of the Doppler frequencies within that spectrum are substantially uniform. With turbulence, on the other hand, the amplitudes of the Doppler frequencies at the low end of the Doppler spectrum are much greater than those at the high end of the spectrum. As will be set forth hereinafter, it can be theoretically demonstrated that the product of frequency and amplitude for Doppler frequencies produced by turbulence should be constant, and experimental observation confirms the theoretical result. The Doppler frequencies produced by an open flame have a frequency-amplitude relationship somewhat intermediate between those produced by a walking person and those produced by turbulence. The amplitude of the flame Doppler frequencies at the high end of the spectrum fall off, but the amplitude of the flame Doppler frequencies is substantially constant up to a much higher frequency than is the case with turbulence.

Accordingly, means are provided for analyzing the frequency-amplitude relationship of the received Doppler frequencies over an appreciable spectrum, or at least at frequencies or frequency ranges spaced from one another within that spectrum, and the alarm is set off only when that relationship assumes a predetermined character, to wit, when the amplitude at higher frequencies is substantially the same as, or does not differ too greatly from, the amplitude at lower frequencies. To put it another way, if a signal is detected in which the amplitude at the higher frequencies is considerably less than the amplitude at the lower frequencies, the alarm is not actuated.

In the system here specifically disclosed this spectrum analysis is carried out in the following way: Through the use of appropriate filters the detected Doppler signal is divided into a high frequency component and a low frequency component. The low frequency component signal is then attenuated relative to the high frequency component signal (the term "attenuation" is employed in a comparative sense. Both signals may be amplified, although to different degrees, or one signal may be amplified and the other signal not amplified, etc.). The two signals are then applied together but in opposite senses to the relay which controls the alarm. That relay is sensitive to the resultant of the two signals, and is so biased that it will cause the alarm to be set off only if the two signals, when combined, produce an appreciable resultant in a given sense. For example, if a turbulence signal is detected the low frequency component thereof will have a higher amplitude than the high frequency component. That higher amplitude will be attenuated so that its value will approach the value of the high frequency signal. When the signals are combined, therefore, the resultant signal will have a small value. On the other hand, if a true intruder is detected the original amplitudes of the high and low frequency signals will be substantially equal. After the low frequency signal has been attenuated and combined with the high frequency signal, the amplitude of the resultant signal, while perhaps less than the amplitude of the original signal, will nevertheless be sufficiently large, and will be applied to the relay in the proper sense, as to cause the relay to set off the alarm.

It has been found that the high frequency signal tends to pass through the spectrum-analyzing circuitry more rapidly than the low frequency signal. An artificial time delay is therefore preferably incorporated into the high frequency side of the spectrum analyzing circuit, in order that the high and low frequency signals may be properly combined. In addition, in the case of circuit transients or the like it has been noted that the high frequency Doppler signals may last for a longer period of time than the low frequency Doppler signals. Consequently it has been found desirable to provide the high frequency side of the spectrum analyzing circuit with substantially the same time constant as the low frequency side, this time constant being active on the high frequency signals before they are rectified.

In the above discussion, and in the remainder of this specification, the terms "high frequency" and "low frequency" as applied to the Doppler frequencies are relative. The "low frequencies" may be between 2 and 5 cycles per second, and the "high frequencies" may be above 5 cycles per second and, as here specifically disclosed, within the range of 25 to 50 cycles per second. All of these frequencies, it will be appreciated, are low frequencies in an absolute sense. The terms "high frequencies" and "low frequencies" as applied to the Doppler signals are further to be differentiated from the frequencies of the radiations transmitted into the room and the frequency of the radiations actually transduced by the receiving system, those frequencies usually being in the ultrasonic range or higher and therefore being high frequencies in the conventional sense.

To the accomplishment of the above, and to such other objects as may hereinafter appear, the present invention relates to a method for eliminating the effects of turbulence and other occurrences in a detection system which receives energy within a frequency spectrum, and to the circuitry employed in accomplishing that result, all as defined in the appended claims and as described in this specification, taken together with the accompanying drawings, in which:

Figure 1:
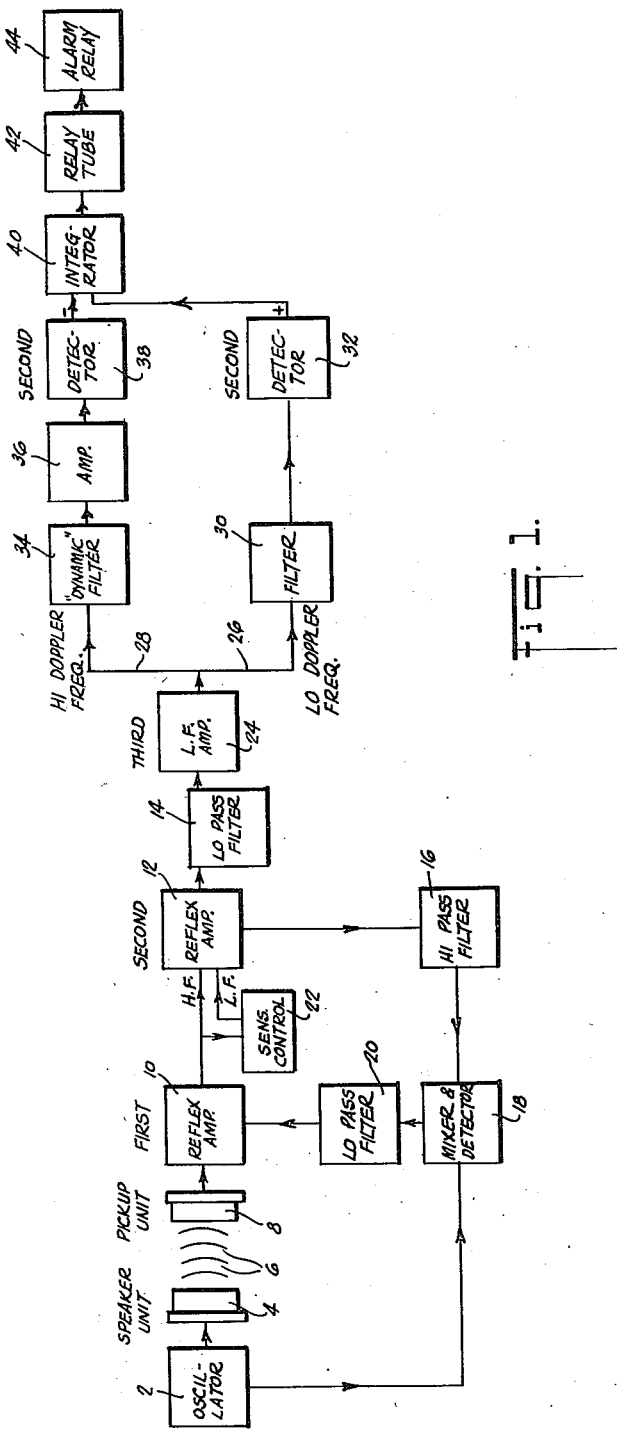
Fig. 1 is a schematic block diagram of the detection system of the present invention.

In the Doppler effect detection system in conjunction with which the present invention is here specifically disclosed, an oscillator unit 2 generates energy at a predetermined high frequency, preferably but not necessarily in the ultrasonic range, that energy being transmitted into the space to be protected, usually a closed room or a portion thereof, by means of a transducer or speaker unit 4. That energy, schematically represented by the curved line 6 in Fig. 1, traverses the space to be protected, is reflected from objects therein, or in some other way reaches and is transduced by a pickup unit 8, the output from that pickup unit being in the form of electrical signals having a frequency corresponding to the frequency of the energy transduced. If there is no movement in the space being protected, the frequency received by the pickup unit 8 will be identical with that transmitted by the speaker unit 4. On the other hand, if there is motion in the space being protected, either motion of a discrete object, acceleration of the air due to turbulence or some similar phenomenon, or the movement of an open flame, of if a shock sound or other transient effect should be detected, the signal from the pickup unit 8 will be composed of the transmitted frequency plus frequencies differing therefrom by a given amount depending on the rapidity of the motion or on the particular characteristic of the shock sound or transient effect.

These signals, all substantially at a high frequency in the ultrasonic range or above, are amplified by first and second reflex amplifier stages 10 and 12. Connected to the second reflex amplifier stage 12, and defining two independent paths therefrom, are low pass filter 14 and high pass filter 16. The low pass filter 14 rejects signals having a frequency in the range of the transmitted signals, whereas the high pass filter 16 permits such signals to pass therethrough. Consequently the amplified signals in the ultrasonic range pass through the high pass filter 16 to a mixer and detector 18, the latter also having an input from the oscillator 2.

In the mixer and detector 18 the received signals are beat against a frequency corresponding to that of the transmitted energy, and the resultant difference frequency is detected. If the received and transmitted energy are both at the same frequency, there is no difference frequency, and consequently the Doppler output from the mixer and detector 18 is zero. On the other hand, if the received signals include frequencies which differ from the transmitted frequency, then there will be an output of the mixer and detector 18 at a frequency equal to the difference between the transmitted and received frequencies. The difference frequency is the Doppler frequency.

The output of the mixer and detector 18 goes to a low pass filter 20 which just permits the difference frequency to pass, but which will not pass the high frequencies actually received by the pickup unit 8. That difference frequency, hereinafter termed the Doppler signal, returns to the first reflex amplifier 10, where it is amplified. From there it goes to the second reflex amplifier 12 via a sensitivity control 22, the circuitry being such that the sensitivity control 22 is active substantially only on the Doppler signal and not on the high frequency signal. Since the Doppler signal is at a comparatively low frequency, for example, below 100 cycles per second, it is rejected by the high pass filter 16 but goes from amplifier stage 12 through the low pass filter 14 to a third amplification stage 24.

Thus far the operation of the system is substantially in accordance with that utilized in commercial intruder detection systems operating according to the principle of the aforementioned Bagno Patent 2,655,645. It is from this point that the present system departs from the prior systems in order to eliminate the unwanted effects of turbulence. In order to understand the significance of the departure which the present system makes from prior systems, it seems appropriate at this point to discuss the nature of the Doppler frequencies produced by turbulence and to compare those frequencies with the Doppler frequencies produced by a flame or by motion of an actual intruder.

The effect of turbulent eddies in the air caused by convection or by the action of a fan, for example, can perhaps be theoretically explained according to the following argument, in terms of the law of conservation of momentum. Let us consider a miniature pocket of air that has been accelerated by a radiator or fan, and analyze what occurs as that pocket of air moves into a body of still air. This theoretical analysis will here be presented in a relatively concise manner in terms of the variables involved without attempting to completely evaluate the constants involved.

Assume that in an enclosure with a still atmosphere, a small sphere of air of radius $(r)$ has been accelerated into motion and a parallel beam of sound is traversing the sphere with a component at right angles to its motion. Let $(V)$ be the velocity of motion of the pocket of air and $(v)$ be the velocity of sound in still air. Because the sound is traveling at right angles to the average velocity of the pocket, the resulting average velocity $(v_t)$ of sound traversing the pocket is:

(1) $$v_t = \sqrt{V^2 + v^2}$$

Since the maximum velocity of the pocket of air is in the order of 1% of the speed of sound, the number of waves in the pocket is changed by less than 1 part in 10,000. This is a negligible change.

The Doppler effect is much more pronounced for the component of sound crossing the pocket in the direction of its motion. In this case the pocket has an average velocity $(V)$ with which it is moving away from or approaching the sound source.

The number of waves $(n)$ in transit in an enclosure of length $(L)$ will be the sum of the number of waves within the pocket of average length $(l)$ plus the number of waves outside of the pocket.

(2) $$n = \left( \frac{l}{\frac{v \pm V}{F}} + \frac{L-l}{\frac{v}{F}} \right) \text{ since } \frac{v}{F} = \lambda, \text{ wave length}$$

The Doppler frequency $(\Delta F)$ being the rate of change of waves between the transmitter and receiver becomes:

(3) $$\frac{\Delta F}{F} = \frac{1}{F}\frac{dn}{dt} = \frac{dl}{dt}\left(\frac{1}{v \pm V} - \frac{1}{v}\right) \pm \frac{l\frac{dV}{dt}}{(v \pm V)^2}$$

but since $(V)$ is of a much smaller order than $(v)$ (4) $$\frac{1}{v}\left(1 \pm \frac{V}{v}\right) \text{ can be substituted for } \frac{1}{v \pm V}$$

and $(v^2)$ for $(v \pm V)^2$ and (4) becomes (5) $$\frac{\Delta F}{F} = \frac{1}{v^2}\left(V\frac{dl}{dt} + l\frac{dV}{dt}\right) = \pm \frac{1}{v^2}\frac{d(lV)}{dt}$$

Let the mass of the pocket be $(m)$ and the density of the air be $(\delta)$ (6) $$\text{then } m = K\delta l^3 = K_1 l^3$$

From the conservation of linear momentum (7) $$K_2 = mV \text{ or } K_3 = l^3 V \text{ or } V = \frac{K_3}{l^3}$$

Substituting (7) in (5)

(8) $$\frac{\Delta F}{F} = \pm d\frac{\left(\frac{K_3}{l^2}\right)}{dt} = \pm 2\frac{K_3}{l^3}\frac{dl}{dt}$$

Since the pocket grows by diffusion, we can apply the Einstein diffusion formula to it.

(9) $$l_0^2 + (\Delta l)^2 = Kt, \text{ where } l_0 + \Delta l = l$$

and $(\Delta l)$ is the increase in radius since the diffusion of the pocket started.

If $\Delta l$ is large in respect to $l_0$, that is, considerable diffusion had occurred before the pocket was in the detectable range, we can write:

(10) $$l^2 = K_4 t$$

or

(11) $$\frac{dl}{dt} = \frac{K_4}{2l}$$

Substituting in (8), and including $(F)$, the basic frequency and all other constants into the constant $(K_5)$ we get:

(12) $$F = \frac{K_5}{l^4}$$

In the sequence that describes the life of the pocket, the average power density $$\left(\frac{dp}{d\Delta F}\right)$$

generated as Doppler frequency in the frequency range $(\Delta F)$ to $(\Delta F + d\Delta F)$ is the power density $(p)$ falling on the pocket from the frequency source multiplied by the portion of the time $$\left(\frac{dt}{d\Delta F}\right)$$

and divided by the time (T, the average life of the pocket) the frequency is within that range.
This becomes:

(13) $$\frac{dp}{d\Delta F} = \frac{dt}{d\Delta F}\frac{p}{T}$$

The power (P) is the power density multiplied by the area (A) of the pocket which becomes:

(14) $$P = pA = pK_6 l^2$$

Or (dP) the total average Doppler power at that increment of frequency becomes:

(15) $$\frac{dP}{d\Delta F} = \frac{p}{T}\frac{dt}{d\Delta F}(K_6 l^2)$$

but differentiating (12), substituting in (15), inverting, and including both (T) and (P) in the new constant ($K_7$), we get:

(16) $$\frac{dP}{d\Delta F} = K_7 l^3$$

Since the amplitude ($\epsilon$) varies as the square root of the power we can write:
For a fixed increment ($d\Delta F$)

(17) $$\epsilon_{\Delta F} = K_9 l^4$$

or:

(18) $$\Delta F \epsilon_{\Delta F} = K_{10}$$

In the space under consideration an ergotically distributed ensemble of such sequences exists, so that the average amplitude at each frequency, over any appreciable increment of time, follows the above equations. The product $$\Delta F \epsilon_{\Delta F}$$

is constant.

If the exact Formula 9 for diffusion is used instead of the approximate Formula 10 in this derivation, we get:

(19) $$\Delta F \epsilon_{\Delta F} = K_{11}\sqrt{\frac{l - l_\sigma}{4l - 3l_\sigma}}$$

This hardly alters the previous conclusion (18), since over the entire range of $h$, from $l = 2l_\sigma$ to $l = \infty$ the product of $$\Delta F \epsilon_{\Delta F}$$

varies in the order of 10%. Preliminary measurements indicate that within the range that concerns us $l$ is considerably greater than $2l_0$, so that $$\Delta F \epsilon_{\Delta F}$$

is constant within the experimental error.

It thus becomes apparent that the product of the amplitude and Doppler frequency should be constant for linear turbulent motion. In a similar way we can analyze the effects of rotational momentum. These results, which will not be here included show a departure from the condition where the product of the Doppler frequency and amplitude is constant. However, over a 50 to 1 frequency range, the departure from constancy is less than 2 to 1.

This characteristic of the Doppler spectrum arising from turbulence would appear theoretically to be distinct from the comparable characteristics of the Doppler spectrum produced by a moving intruder or from a flame. In order to verify this theoretical analysis, actual tests were made to determine the Doppler spectrums generated by typical signal sources. For these tests a standard commercial detection system was modified so as to have a wider Doppler frequency response than usual. The Doppler signal was taken from the last amplifier stage of that modified system and fed through a constant decrement filter variable from 1 to 100 C. P. S. The output was then fed through a Hi-pass filter (adjusted to be 3 db down at the frequency being measured) to a detector. The detector provided a D. C. output voltage proportional to the average R. M. S. input.

Figure 3:
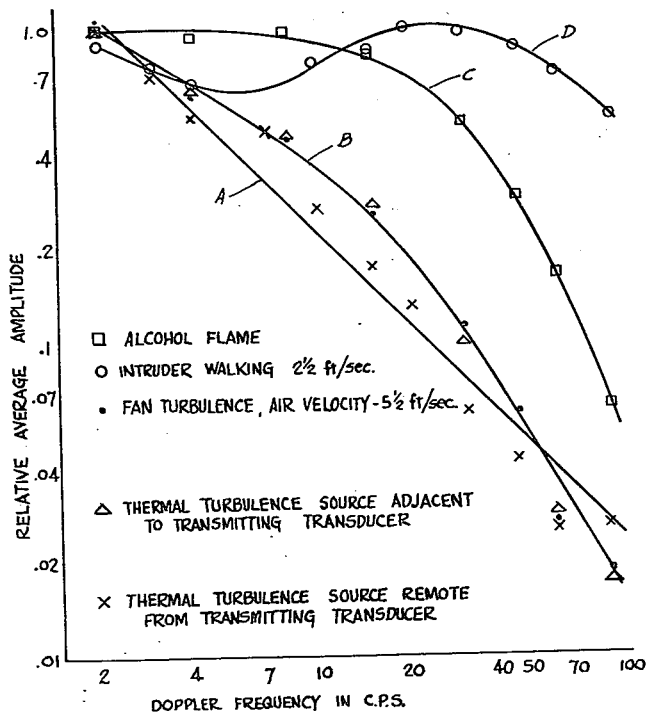
Fig. 3 is a graphic representation of the amplitude-frequency characteristics of various types of phenomena, as experimentally determined.

By means of the constant decrement filter, various Doppler frequencies could be selected from 2 to 90 C. P. S. and their average R. M. S. amplitude measured. To obtain the curves presented in Fig. 3 eight to ten frequencies were selected throughout the 2 to 90 cycle range and the average R. M. S. amplitude of each frequency determined over a period of thirty seconds.

The heat source used for thermal turbulence measurements was a small steam radiator having a power input of 1 kw. and a surface temperature of 170° F. The radiator was located three feet from the transmitting transducer when considered remote, and six inches from the transmitting transducer when considered adjacent.

The fan turbulence spectrum was obtained by directing an air stream past the transmitting transducer with a velocity of 5½ ft. per sec. at a point 6 inches from the transducer.

The intruder spectrum was obtained by having the intruder walk in a five foot diameter circle at a linear speed of 2½ feet per second. The intruder was walking in an area midway between the transmitting and receiving transducers.

The experimental results are illustrated in the graph, Feb. 3. Since that graph is on a logarithmic scale, it will be seen that the turbulence phenomena represented by curves A and B, as experimentally determined, substantially corroborate the theoretical analysis set forth above, to wit, that the product of a given Doppler frequency and the relative average amplitude of the signal at that frequency is a constant. When the transducer is located close to the Doppler source the Doppler spectrum contains a greater amount of high frequency components than when the transducer is located remotely therefrom. This indicates high air accelerations at the source, as would be expected.

The law of conservation of momentum implies that the peak amplitude of thermal turbulence will occur at a frequency monotonically decreasing with increasing size of the enclosure.

Additional experimental data from a large enclosure showed that thermal and draft turbulences reached a peak amplitude of about 200 times their two-cycle value at a frequency of about one cycle every three minutes.

We may expect the intruder spectrum to reach a peak in the region of $F_D$ the Doppler frequency computed from the average speed of the intruder), to merge with the turbulence spectrum at the lower frequencies and to contain high amplitude components higher than $F_D$. The air turbulence generated by a person walking would determine the low frequency end of the spectrum. The high frequency part of the spectrum would result from the rapid movement of various body parts during walking and the introduction of harmonics by multiple reflection, cross-modulation and distortion. The experimentally determined intruder spectrum is consistent with the expected results.

The Doppler spectrum of a flame may be expected to be rich in high frequency components, as high energy dissipated in a low density causes high velocities and accelerations, and appears as the dancing and jitter of the flame. It may also be expected to be rich in low frequency components as a result of the heat turbulence it generates. The experimentally determined flame curve shows these general characteristics.

Since the Doppler spectrum derived from turbulence is thus seen to be different from the Doppler spectrum derived from flame or from the movement of an intruder, it follows that if the spectrum of the detected Doppler signal from the low frequency amplifier 24 is analyzed in such a way as to differentiate unwanted turbulence signals from wanted intruder and flame signals, the system can be caused to actuate an alarm only when the latter type of signal is detected and not when the former type of signal is detected.

In the form here specifically disclosed, and again making reference to the block diagram, Fig. 1, this is accomplished as follows: Two lines of travel extend from the amplifier 24, to wit, the low frequency line 26 and the high frequency line 28. The low frequency line 26 includes a filter 30 which will pass Doppler frequencies at the low end of the Doppler spectrum but which will reject frequencies at the high end thereof. The output from the filter 30 is detected at 32, the resultant detected signal being positive in sign. The high frequency line 28 includes a "dynamic" filter 34 which will pass signals at the high end of the Doppler spectrum but which will reject signals at the low end thereof. The output from the filter 34 is amplified at 36 and the resultant signals are detected at 38, the output of the detector 38 being negative in sign.

The positive output from the low Doppler frequency detector 32 and the negative output from the high Doppler frequency detector 38 are both fed to an integrator 40 the output of which controls a relay tube 42 which in turn controls the alarm relay 44. Since the high Doppler frequency signals 38 are amplified at 36, whereas the low Doppler frequency signals are not thus amplified, the net effect is that the low Doppler frequency signals are attenuated relative to the high Doppler frequency signals. The relay tube 42 is so biased as normally to pass current and energize the alarm relay 44 so as to keep the alarm from being actuated. This arrangement is preferred because of its "fail-safe" character. The alarm relay 44 will be actuated provided that a sufficiently negative bias is superimposed on the relay tube 42 so as to bias that tube to cut-off. The high Doppler frequencies, if applied alone to the tube 42, would accomplish this result. The low Doppler frequencies, when applied, tend to prevent the high Doppler frequencies from accomplishing this result. If a turbulence signal is received, in which the high Doppler frequencies have a much lower amplitude than the low Doppler frequencies, those high Doppler frequencies, even after being amplified at 36, nevertheless are substantially cancelled by the low Doppler frequencies, the tube 42 continues to conduct, and the alarm relay 44 is not actuated. On the other hand, if intruder or flame signals are detected, in which the low and high Doppler frequencies have substantially the same magnitude, the negative signals derived from the high Doppler frequency detector 38 will be considerably greater in magnitude than the low Doppler frequency signals derived from the low Doppler frequency detector 32, a negative bias will be applied to the tube 42, the alarm relay 44 will be actuated or deenergized, and the alarm will be set off. Thus the system is capable of distinguishing between turbulence effects on the one hand and intruder and flame effects on the other hand. The sensitivity control 22 may therefore be set to as high a value as desired consistent with the type of intruder or flame which it is desired to detect without having to compromise in any way.

The integrator 40 is included in the system because, as set forth in considerable detail in Bagno application Ser. No. 371,854, filled August 3, 1953, and entitled "Alarm System With Means for Eliminating the Effect of Unwanted Signals," owned by the assignee of the instant application, its presence, in conjunction with the signal limiting features of the detectors 32 and 38, succeeds in substantially eliminating the setting off of the alarm by shock sounds.

It has also been discovered that the amplitude-frequency relationship of the spectrum of Doppler effect signals produced by shock sounds or by such transient impulse phenomena as sparking, sudden line voltage changes, or even complete failure of line voltage for a short period of time on the order of a few seconds, is substantially similar to that of turbulence signals. Consequently the present system further assists in well nigh eliminating the adverse effects of any of these extraneous phenomena.

Figure 2:
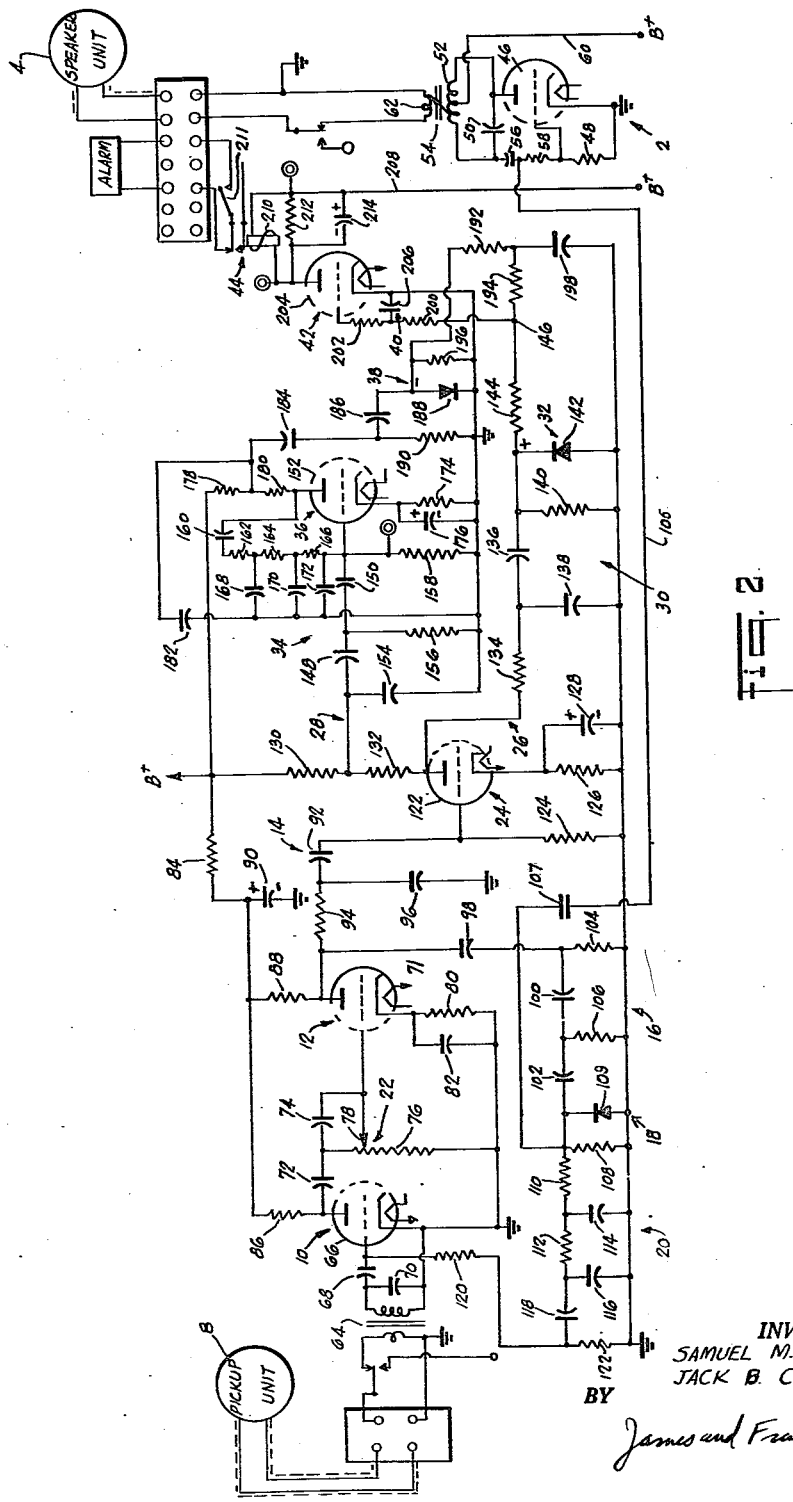
Fig. 2 is a circuit diagram thereof.

Turning now to the detailed circuit diagram of Fig. 2, the oscillator 2 comprises a tube 46 (one half of a 6NS7 tube) the cathode of which is connected to ground, the grid of which is connected to ground by a 47,000 ohm resistor 48, the plate of which feeds a tuned circuit comprising a .0015 mf. condenser 50 and the primary winding 52 of a stepdown transformer 54, the grid being coupled to that tuned circuit by a .001 mf. condenser 56 and a 22,000 ohm resistor 58. Suitable positive potential is applied to the plate of the tube 46 via lead 60 centertapped to the primary winding 52. The secondary winding 62 of the transformer 54 is connected to the speaker unit 4.

The pickup unit 8 is connected to the first reflex amplification stage 10 by means of transformer 64, the amplification stage 10 being accomplished by means of tube 66 (one half of a 6SL7 tube) the cathode of which is connected to ground and the grid of which is connected to the cathode by means of a 200 mmf. condenser 68 and the secondary winding of the transformer 64, that secondary winding being tuned by a 200 mmf. condenser 70. The plate of the tube 66 is coupled to the grid of the tube 71 (one half of a 6SL7 tube) by a .05 mf. condenser 72 and a 500 mmf. condenser 74 in series, a 1 megohm resistance 76 being connected between ground and a point between the condensers 72 and 74, a movable contact 78 bypassing the condenser 74. The value of the condensers 72 and 74 is such that high frequency signals, in the ultrasonic range or above, will pass through the condenser 74, whereas the Doppler frequencies will not. The potentiometer defined by the resistor 76 and the movable contact 78 thus constitutes the sensitivity control 22, and that control will be effective substantially only on the Doppler frequencies.

The cathode of the tube 70, which provides the second amplification stage 12, is connected to ground via 4700 ohm resistor 80 bypassed by a .1 mf. condenser 82. Suitable positive potential is applied to the anodes of the tubes 66 and 70 via 120,000 ohm resistor 84 and resistors 86 and 88 respectively, the resistor 86 having a value of 270,000 ohms and the resistor 88 having a value of 180,000 ohms. The B+ line is bypassed to ground by a 40 mf. capacitor 90.

The low pass filter 14 is defined by a .1 mf. condenser 92 in series with a 510,000 ohm resistor 94, a .01 mf. condenser 96 by passing to ground at a point between the condenser 92 and the resistor 94. The high pass filter 16 is defined by 100 mmf. condensers 98, 100 and 102, with 510,000 ohm resistors 104 and 106 connected between the condensers and ground. Both of these filters 14 and 16 are connected to the plate of the second reflex amplifier tube 70.

The signals initially received are at a high frequency, here specifically disclosed as in the ultrasonic range. Therefore they will not pass through the low pass filter 14, but they will pass through the high pass filter 16. Lead 105 extends between the oscillator 2 and the end of the high pass filter 16, 5 mmf. condenser 107 being interposed therein, and selenium rectifier 109 and 470,000 ohm resistor 108 are connected between the end of the lead 104 and ground. The rectifier 109 acts as a detector, detecting the result of mixing or beating the received frequencies, which have passed through the high pass filter 16, with the transmitted frequencies brought to the rectifier 109 by the lead 105. The low pass filter 20 which follows, and which will pass only low frequencies in the Doppler range, which Doppler frequencies will be present only when the received frequencies differ from the transmitted frequencies by a predetermined amount, consists of 220,000 ohm resistors 110 and 112 and the .01 mf. condensers 114 and 116, the output from the low pass filter 20 being coupled to the grid of the amplifier tube 66 by a .02 mf. condenser 118 and 220,000 ohm resistor 120, 10 megohm resistor 122 being connected between ground and the point between the condenser 118 and the resistor 120.

The Doppler frequency signals, if present, will then be amplified by the tubes 66 and 71, these low frequency signals will be affected by the setting of the sensitivity control 22, and these low frequency signals will pass through the low pass filter 14 and be coupled to the grid of tube 122 (one-half of a 6SN7 tube), which constitutes the low frequency amplifier 24, the grid of that tube 122 being connected to ground by a 2.2 megohm resistor 124 and the cathode thereof being connected to ground by a 4,700 ohm resistor 126 bypassed by a 20 mf. condenser 128. Positive potential is applied to the plate of the tube 122 through the 100,000 ohm resistor 130 and the 22,000 ohm resistor 132 connected in series.

The low Doppler frequency path 26 is connected to the plate of the tube 122, the low pass filter 30 thereof being defined by 220,000 ohm resistor 134 and .5 mf. condenser 136 conneccted in series, .1 mf. condenser 138 being connected between ground and a point between the resistor 134 and the condenser 136, 1.2 megohm resistor 140 being connected between ground and the far end of the condenser 136. This filter 30 is followed by the detector 32, in the form of a selenium rectifier 142. The detector 32 derives from the low frequency Doppler signal, if present, a positive non-alternating signal which passes through 4.7 megohm resistor 144 to point 146.

The high Doppler frequency path 28 is connected to the plate of the tube 122 via resistor 132. The first basic element of the path 28 is the filter 34 which comprises .01 mf. condensers 148 and 150 connected between the upper end of the resistor 132 and the grid of the tube 152 (one-half of a 6SL7 tube), that tube defining the amplifier 36, .02 mf. condenser 154 and 1.2 megohm resistors 156 and 158 being connected between the condensers 148 and 150 and ground. The filter further comprises a circuit between the plate of the tube 152 and the grid thereof, that circuit including a .1 mf. condenser 160, 1.2 megohm resistors 162, 164 and 166, and bypassing condensers 168, 170 and 172, the condensers 168 and 170 having a value of .01 mf. and the condenser 172 having a value of .008 mf. The cathode of the tube 152 is connected to ground by means of 4,700 ohm resistor 174 bypassed by 10 mf. condenser 176, and positive potential is applied to the plate of the tube 152 via 270,000 ohm resistor 178 and 120,000 ohm resistor 180. A point between the resistors 178 and 180 is bypassed to ground by means of .01 mf. condenser 182.

The circuit elements 148, 150, 154, 156 and 158 define a high pass filter designed to reject the low Doppler frequencies but to pass the high Doppler frequencies. The elements 160—172 constitute a filter which couples the plate of the tube 152 to the grid thereof. This latter filter constitutes a phase shifting network. When 180 degrees of phase shift occurs for a given frequency the amplifier 36 will operate regeneratively for that frequency. The circuit is specifically designed to provide a 180 degrees phase shift at approximately 30 to 35 C. P. S. Frequencies higher than that value are shifted more than 180 degrees so that regenerative action occurs with a lesser degree with respect to them. Moreover, those higher frequencies tend to be bypassed by the condensers 168—172, so that their resultant magnitude is less than would otherwise be the case. The combination of this action with the normal action of the filter defined by the elements 148, 150, 154 and 156 produces an overall frequency response which has a very sharp cutoff on the low frequency side, which amplifies frequencies on the order of 30 to 35 C. P. S. to a maximum degree, and which amplifies higher frequencies to a lesser degree.

In connection with this action it will be noted that in the low Doppler frequency line 26 there is no phase shift nor is there any amplification, so that the low frequency Doppler signals are in fact degenerated or attenuated. The high frequency Doppler signals, on the other hand, are amplified, and selected frequencies within the high frequency Doppler range are amplified to a particularly high degree.

The output of the tube 152 passes through .03 mf. condenser 184 and .5 mf. condenser 186 to the detector 38, constituted by selenium rectifier 188, a 510,000 ohm resistor 190 being connected between ground and the end of the condenser 186 remote from the rectifier 188. The high Doppler frequency signals are detected by the rectifier 188, and the negative side of that rectifier 188 is connected to point 146 via 1.2 megohm resistors 192 and 194, a 1.2 megohm resistor 196 being connected between ground and the negative end of the rectifier 188, a .22 mf. condenser 198 being connected between ground and a point between the resistors 192 and 194.

Thus point 146 receives a positive signal resulting from the detection of the degenerated low Doppler frequency signals and a negative signal resulting from the regenerative amplification and detection of the high Doppler frequency signals.

The combined signals applied to point 146 pass through 510,000 ohm resistor 200 and 2.2 megohm resistor 202 to the grid of tube 204, which constitutes the relay tube 42. The cathode of the tube 204 is connected directly to ground and a .5 mf. condenser 206 is connected between ground and a point between the resistors 200 and 202. The condenser 206 constitutes the integrator 40. Suitable positive potential is applied to the plate of tube 204 via lead 208 and coil 210 of alarm relay 44, the coil 210 being bypassed by 15,000 ohm resistor 212 and 10 mf. capacitor 214 connected in parallel. The arrangement is such that the tube 204 will normally conduct current, thus energizing the coil 210 and maintaining the relay 44 in a condition such that the alarm is not actuated. However, if a sufficiently negative bias is applied to the grid of the tube 204 through the charging of the integrating condenser 206, the tube 204 will cease to conduct, or will conduct to an insufficient degree, the coil 210 will be de-energized or insufficiently energized and the relay 44 will close to actuate the alarm. (It is illustrated in that condition, but with manual disconnect valve 211 open.) Since only the high Doppler frequency signals are fed to the condenser in a negative sense, it is only when high Doppler signals of sufficient magnitude are received by that condenser, and for a sufficient period of time, that the alarm will be set off. The presence of detected low Doppler frequency signals will tend to counteract the effect of the detected high Doppler frequency signals because the detected low Doppler frequency signals are applied to the condenser 206 in a positive sense.

Purely by way of example, let us assume that a signal is received in which the amplitudes of the low and high Doppler frequencies are substantially equal and are such as would, if unamplified and unattenuated, produce signals at point 146 which would each have a magnitude of 8 volts. The system here disclosed may attenuate the low Doppler frequency signal to a value of 2 volts. The high Doppler frequency signal may be amplified to 10 volts. Eliminating the integration effect for purposes of simplicity, the resultant bias will have a magnitude of 8 volts and will be negative. This will be sufficient to bias the tube 204 to cutoff, and the alarm will be actuated. Signals produced through movement of an intruder or from a flame will have the aforementioned characteristics insofar as their amplitude-frequency relationship is concerned.

If, however, the circuit receives a turbulence signal the low Doppler frequency component of which is fully as strong as the low Doppler frequency component of the intruder or flame signal above discussed, the amplitude of the high Doppler frequency components of the turbulence signal will be much lower. They may, for example, be of a magnitude such as to produce, even after regenerative amplification, a negative bias of perhaps .2 volt. The low Doppler frequency component of the turbulence signal is attenuated to substantially the same magnitude, but in a positive sense. As a result, the tube 204 will not be biased to cutoff, will continue to conduct, and the alarm will not be actuated.

The instant system therefore succeeds in analyzing the amplitude-frequency relationship of the received signal over a predetermined spectrum and in discriminating between the relationship which exists in the case of turbulence signals as against the relationship which exists in the case of intruder or flame signals.

It has been found that the high Doppler frequency signals tend to pass through the line 28 much more rapidly than the low Doppler frequency signals pass through the line 26. The result is that the negative bias derived from the high Doppler frequency signals tends to be applied to the integrating condenser 206 sooner than the counterbalancing positive bias derived from the low Doppler frequency signal. There is therefore a tendency for the alarm to be actuated solely on the basis of the high Doppler frequency signals. Accordingly an artificial time delay is incorporated into the line 28, that delay being accomplished in part by the condenser 198 and resistor 194 and in part by the condenser 186 and the resistor 190, the former circuit being active on the detected high Doppler frequency signal and the latter circuit being active on the alternating high Doppler frequency signal. The latter circuit has the greater effect and produces a time constant in the high Doppler frequency line 28 which corresponds to the time constant in the low Doppler frequency line 26. This time equalizing factor is particularly important in connection with transient phenomena, such as shock sounds, arcing, line voltage changes and the like.

In practice a suitable line of demarcation between the high and low Doppler frequencies is 5 C. P. S. As may be seen from Fig. 3, the amplitudes of frequencies up to approximately that value are substantially the same for all of the phenomena discussed, whereas above that value, the amplitude of turbulence phenomena is considerably below that of intruder and flame phenomena. In the present commercial system embodying the instant invention the high Doppler frequency range extends between 25 and 50 C. P. S. By thus selecting two discrete frequency ranges within the overall spectrum which are appreciably spaced from one another a much sharper degree of discrimination is permitted as between turbulence effects on the one hand and intruder and flame effects on the other. These values, however, are here set forth solely for purposes of specificity, and it will be appreciated from the preceding discussion that other values and other ranges could be employed in the practice of the instant invention.

While but a single embodiment of the present invention has been here disclosed, and while the invention has been described solely with reference to a Doppler frequency detection system operating on a transmitted frequency in the ultrasonic range, it will be apparent that the invention is much broader in scope, could be applied to Doppler frequency detection systems utilizing transmitted frequencies in other ranges, and could be applied in systems other than Doppler effect detection systems. While for purposes of convenience the signals whose amplitude-frequency relationship is analyzed over a given spectrum are often referred to as Doppler signals, it will be understood that that term is used only for purposes of explanation in connection with the specific embodiment here disclosed, and that in fact the invention could be applied to the spectrum analysis of signals other than those arising from the Doppler effect. The scope of the invention is therefore to be measured not exclusively in terms of the specific system, circuitry or circuit values above set forth, but instead in accordance with the scope of the following claims.

We claim:

1. Means for eliminating the effects of certain extraneous conditions in a detection system including means for radiating energy of a given frequency into a space, means for receiving the frequencies as modified by disturbances in the space and means for selecting received energy within a frequency spectrum which comprises means for deriving separate signals from the received frequencies within comparatively low and high frequency ranges respectively, means for modifying the signal of one of said ranges differently than the signal of the other of said ranges is modified, means for comparing said signals, and means for actuating an indicator means in accordance with the result of said comparison.

2. Means for eliminating the effects of certain extraneous conditions in a detection system including means for radiating energy of a given frequency into a space, means for receiving the frequencies as modified by disturbances in the space and means for selecting received energy within a frequency spectrum which comprises means for deriving separate signals from the received frequencies within comparatively low and high frequency ranges respectively, means for modifying the amplitude of the signal of said low frequency range differently than the amplitude of the signal of said high frequency range is modified, means for determining the amplitude difference between said signals, and means for actuating an indicator means in accordance with the magnitude of said amplitude difference.

3. Means for eliminating the effects of certain extraneous conditions in a detection system including means for radiating energy of a given frequency into a space, means for receiving the frequencies as modified by disturbances in the space and means for selecting received energy within a frequency spectrum which comprises means for deriving separate signals from the received frequencies within comparatively low and high frequency ranges respectively, means for modifying the signal of one of said ranges differently than the signal of the other of said ranges is modified, means for integrating both said signals together, and means for actuating an indicator means in accordance with the result of said integration.

4. Means for eliminating the effects of certain extraneous conditions in a detection system including means for radiating energy of a given frequency into a space, means for receiving the frequencies as modified by disturbances in the space and means for selecting received energy within a frequency spectrum which comprises means for deriving separate signals from the received frequencies within comparatively low and high frequency ranges respectively, means for modifying the amplitude of the signal of one of said ranges differently than the amplitude of the signal of the other of said ranges is modified, means for integrating both said signals together in opposite senses, and means for actuating an indicator means in accordance with the result of said integration.

5. Means for eliminating the effects of certain extraneous conditions in a detection system including means for radiating energy of a given frequency into a space, means for receiving the frequencies as modified by disturbances in the space and means for selecting received energy within a frequency spectrum which comprises means for deriving separate signals from the received frequencies in the frequency ranges respectively below and above approximately four to five cycles per second, means for modifying the amplitude of the signal of one of said ranges differently than the amplitude of the signal for the other of said ranges is modified, means for integrating both said signals together in opposite senses, and means for actuating an indicator means in accordance with the result of said integration.

6. Means for eliminating the effects of certain extraneous conditions in a detection system including means for radiating energy of a given frequency into a space, means for receiving the frequencies as modified by disturbances in the space and means for selecting received energy within a frequency spectrum which comprises means for deriving separate signals from the received frequencies, one of said signals being derived essentially from received signals on the order of less than five cycles per second and the other of said signals being derived essentially from received signals on the order of 25 cycles per second and above, means for modifying the amplitude of the signal of one of said ranges differently than the amplitude of the signal of the other of said ranges is modified, means for integrating both said signals together in opposite senses, and means for actuating an indicator means in accordance with the result of said integration.

7. Means for eliminating the effects of certain extraneous conditions in a detection system including means for radiating energy of a given frequency into a space, means for receiving the frequencies as modified by disturbances in the space and means for selecting received energy within a frequency spectrum which comprises means for analyzing the amplitude-frequency relationship of the received frequencies within a frequency spectrum including relatively low and high frequencies, and means for actuating an indicating means in response to the output of said analyzing means only when said relationship corresponds to a predetermined character.

8. Means for eliminating the effects of certain extraneous conditions in a detection system including means for radiating energy of a given frequency into a space, means for receiving the frequencies as modified by disturbances in the space and means for selecting received energy within a frequency spectrum which comprises means for analyzing the amplitude-frequency relationship of the received frequencies within a frequency spectrum including relatively low and high frequencies, and means for actuating an indicating means in response to the output of said analyzing means only when said relationship follows a comparatively uniform amplitude-frequency relationship as between said low and high frequencies.

9. Means for eliminating the effects of certain extraneous conditions in a detection system including means for radiating energy of a given frequency into a space, means for receiving the frequencies as modified by disturbances in the space and means for selecting received energy within a frequency spectrum which comprises means for analyzing the amplitude-frequency relationship of the received frequencies within a frequency spectrum including relatively low and high frequencies, and means for preventing the actuation of an indicating means in response to the output of said analyzing means when said relationship corresponds to a predetermined character.

10. Means for eliminating the effects of certain extraneous conditions in a detection system including means for radiating energy of a given frequency into a space, means for receiving the frequencies as modified by disturbances in the space and means for selecting received energy within a frequency spectrum which comprises means for analyzing the amplitude-frequency relationship of the received frequencies within a frequency spectrum including relatively low and high frequencies, and means for preventing the actuation of indicating means in response to the output of said analyzing means whenever said frequencies include low frequency components having a substantially greater amplitude than the high frequency components thereof.

11. Means for eliminating the effects of certain extraneous conditions in a detection system including means for radiating energy of a given frequency into a space, means for receiving the frequencies as modified by disturbances in the space and means for selecting received energy within a frequency spectrum which comprises means for analyzing the amplitude-frequency relationship of the received frequencies within a frequency spectrum including low frequencies less than five cycles per second and high frequencies greater than five cycles per second, and means for preventing the actuation of an indicating means in response to the output of said analyzing means whenever the amplitude of said low frequencies is substantially greater than the amplitude of said high frequencies.

12. Means for eliminating the effects of certain extraneous conditions in a detection system including means for radiating energy of a given frequency into a space, means for receiving the frequencies as modified by disturbances in the space and means for selecting received energy within a frequency spectrum which comprises means for analyzing the amplitude-frequency relationship of the received frequencies within a frequency spectrum including low frequencies less than five cycles per second and high frequencies greater than 25 cycles per second, and means for preventing the actuation of indicating means in response to the output of said analyzing means whenever the amplitude of said low frequencies is substantially greater than the amplitude of said high frequencies.

References Cited in the file of this patent

UNITED STATES PATENTS

| | | |
|---|---|---|
| 2,039,404 | Green et al. | May 5, 1936 |
| 2,709,799 | Norton | May 13, 1955 |
| 2,722,677 | Krueger | Nov. 1, 1955 |